Feb. 16, 1971 R. KINNICUTT, JR 3,563,101
INTERMITTENT DRIVE DEVICE
Filed May 7, 1969 5 Sheets-Sheet 3

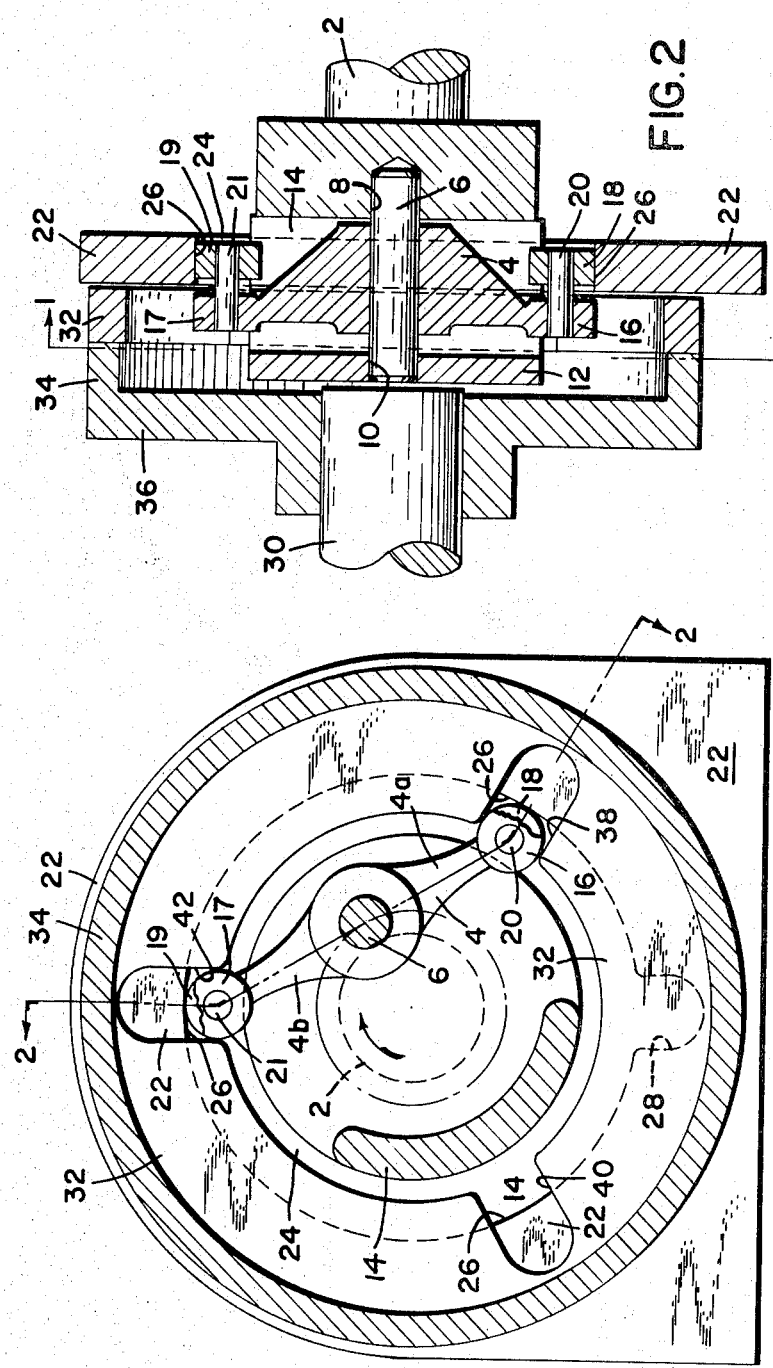

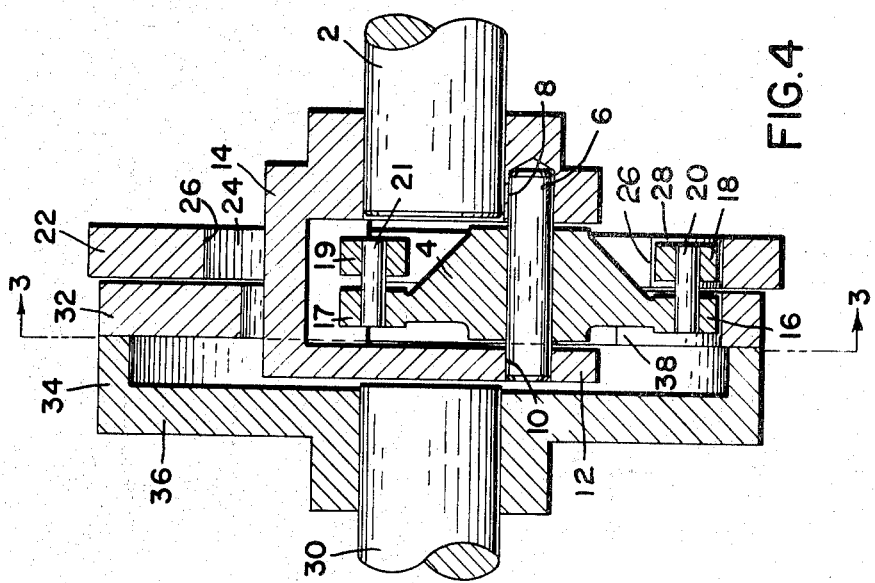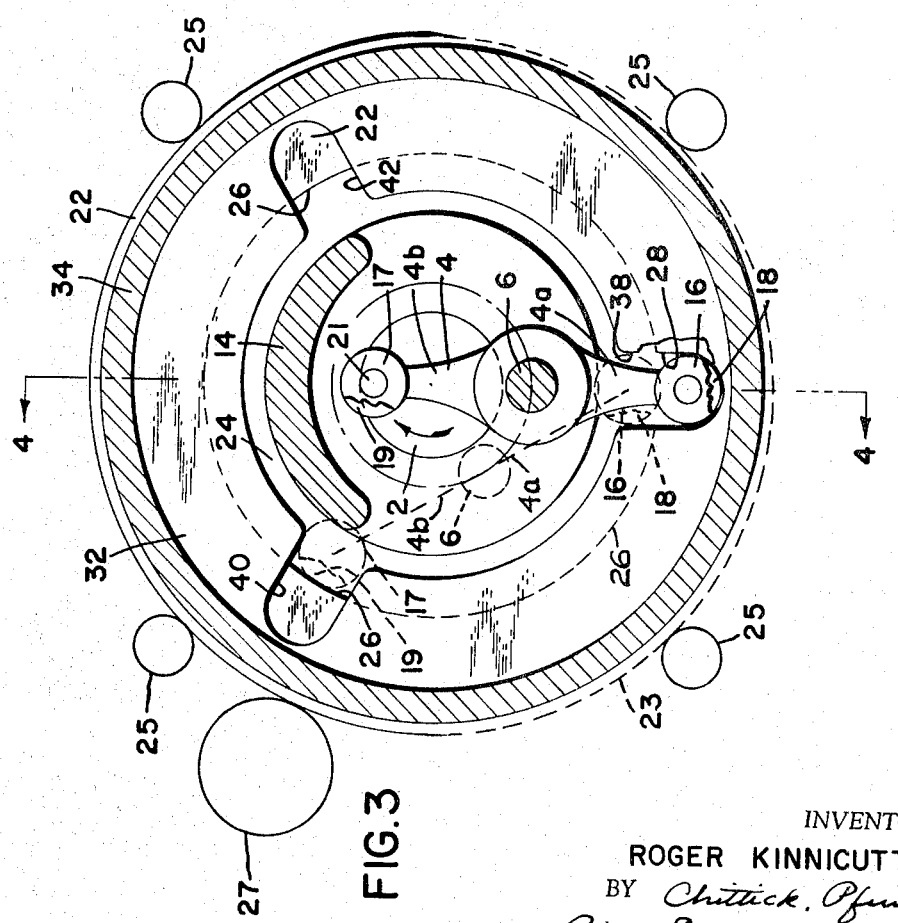

INVENTOR.
ROGER KINNICUTT, JR.
BY Chittick, Pfund,
Birch, Samuels & Gauthier
ATTORNEYS Feb. 16, 1971  R. KINNICUTT, JR  3,563,101
INTERMITTENT DRIVE DEVICE
Filed May 7, 1969  5 Sheets-Sheet 4

INVENTOR.
ROGER KINNICUTT, JR.
BY Chittick, Pfund,
Birch, Samuels + Gauthier
ATTORNEYS Feb. 16, 1971  R. KINNICUTT, JR  3,563,101
INTERMITTENT DRIVE DEVICE
Filed May 7, 1969  5 Sheets-Sheet 5

INVENTOR.
ROGER KINNICUTT, JR.
BY Chittick, Pfund,
Birch, Samuels & Gauthier
ATTORNEYS

# United States Patent Office 3,563,101
Patented Feb. 16, 1971

3,563,101
INTERMITTENT DRIVE DEVICE
Roger Kinnicutt, Jr., Worcester, Mass., assignor to Morgan Construction Company, Worcester, Mass., a corporation of Massachusetts
Filed May 7, 1969, Ser. No. 822,375
Int. Cl. F16h 27/06
U.S. Cl. 74—84                                    14 Claims

ABSTRACT OF THE DISCLOSURE

Means whereby a driving element imparts intermittent motion to a driven element. The motion of the driving element may be rotary, linear or otherwise according to a predetermined path. It may be continuous or reciprocating. The extent and timing of the intermittent motion is determined by the number and spacing of slots in the driven element and in a fixed control element. When a control element slot becomes aligned with a slot in the driven element, a driving arm pivoted on the driving element and normally in compression as it pushes the driven element loses its driving characteristic and enters the aligned slots to act as locking means to prevent temporarily motion of the driven element while the driving element continues its movement. Simultaneously, upon withdrawal of the driving arm from the aligned slots, the edge of a driven element slot, unaligned with a control element slot, is engaged by another pivoted driving arm on the driving element and motion of the driven element is resumed to continue until the driven element slot comes again into alignment with the next control element slot.

BACKGROUND OF THE INVENTION

Mechanisms for causing intermittent or irregular motion of one element under the influence of a continuously rotating or linearly moving element are old and well understood. Some samples are cams, eccentrics and ratchets. However, mechanisms for converting one type of continuous motion into intermittent motion of the same type are generally not available. The mechanism herein disclosed will fill a need heretofore served most commonly by switch operated electrical devices or by mechanically operated clutches.

SUMMARY OF THE INVENTION

The present invention provides a relatively inexpensive mechanism for converting any kind of continuous motion of a driving element that follows a predetermined path into intermittent motion of a driven element along a similar parallel path. The most common paths of motion of the driving and driven elements will be continuous rotary, continuous straight line, reciprocating rotary or reciprocating straight line. Regardless, however, of the path of motion of the driving element, the mechanism can be readily arranged to duplicate such path in the intermittently driven element.

The mechanism contemplates a driving element, a driven element guided along a path parallel to that of the driving element and a fixed control element. The driving element by means of a pivoted compression arm applies a pushing force to the driven element. The driven and control elements have slots therein which in the course of movement of the driven element periodically come into alignment. When this condition obtains, the driving arm is released from its driving condition against the driven element and moves automatically into the aligned slots thereby stopping the motion of the driven element and locking it temporarily in its plane of movement to the fixed control element. Motion of the driving member continues and in due course the first driving arm is withdrawn from locking position in the aligned slots as a second driving arm integral with the first is automatically positioned in driving relation with the driven element. The mechanism is so constructed that movement of the driven element resumes immediately upon release of the locking connection between the fixed control element and the driven element.

In a rotary situation, the extent of the intermittent angular rotation of the driven element during one revolution of the driving element may be predetermined by the spacing of the slots. Additionally, a plurality of intermittent movements of the driven member during one revolution of the driving element may be arranged.

Similarly, in the case of linear motion, the distance of travel of the driven element is controlled by the spacing of the slots in the fixed control element. These distances can be readily changed by substituting in the machine a new control element slotted to meet the new requirements.

The driving arm pivoted on the driving element and acting in compression against the driven element has a transverse portion on its end, a first part of which applies driving pressure to the driven element and simultaneously a second part presses against and runs along an edge of the control element. The engagement of the second part of the driving arm with the control element edge prevents movement of the driving arm away from driving position against the driven element until the slot in the driven element, extending directly away from the driving arm position, comes into alignment with the next slot in the control element. Upon this happening, the pivoted driving arm, relieved of the restraining pressure of the control element edge, immediately begins to enter the two aligned slots. Movement of the driven element stops and it is temporarily locked to the fixed control element.

Continued movement of the driving element causes a second driving arm integral with the first driving arm to swing about the same pivot to cause one part of the free end to locate itself in driving position in the outer end of the next slot in the driven element. At the same time, the first driving arm is withdrawn from locking position in the aligned slots. The second driving arm stays in operative position against the driven element because of the engagement of the second part of the arm end with the control element edge just as was the case of the first driving arm.

Movement of the driven element under the influence of the second driving arm then resumes and continues until the oprative slot in the driven element reaches a position of alignment with the next slot in the control element.

At this point, movement of the driven element again ceases as the end of the second driving arm enters the two aligned slots to lock the driven element temporarily in stationary position.

Further movement of the driving element causes the next pivoted driving arm (which preferably will be the first arm in the case of rotary movement and a third arm in the case of linear movement) to swing into operating position just as the second arm is removed from the two aligned slots. The intermittent operation can continue as long as the necessary slots are present in both the driven and fixed elements.

In both rotary and linear forms, the spacing of the slots in the driven element must be equal to the distance from the end of the first driving arm to the end of the second driving arm. The distance between the slots in the control element may be selected to meet the travel requirement of the driven element except, however, that the control slots must be farther apart than the distance between the ends of the driving arms. In other words, the distance the driven element travels between stopping points will be the distance between the control element slots less the distance between the adjacent operative driven element slots. In the rotary construction, this would be measured in degrees. In the linear construction, it would be measured in inches, feet, etc.

It should be noted, however, that the driven element can be maintained stationary and locked to the control element for a determinable movement of the driving element (rotary or linear by having two or more slots in the control element spaced at the same distance or degrees apart as the slots in the driven element. By this arrangement, the ends of the driving arms will successively enter aligned slots keeping the driven and control elements locked together. Motion of the driven element will resume when the next slot in the control element is at a greater distance than the next slot in the driven element.

In the case of a reciprocating driving element (which causes the driven element to move back and forth a distance equal to the distance between the slots in the control element less the distance between adjacent slots in the driven element), the stroke of the driving element may vary between the distance between the slots in the control element plus or minus the distance between adjacent slots in the driven element. Stated differently, the driving element may have over or under travel within limits without affecting the constant distance traveled by the driven element in each reciprocation. The over travel can vary from a maximum equal to the distance between the slots in the control element plus the distance between adjacent slots in the driven element to a minimum equal to the distance between the slots in the control element less the distance between adjacent slots in the driven element.

Summarizing the above:

For continuous rotary or linear motion of the driving element, let $X$=distance between control element slots
$Y$=distance between driven element slots.

The distance traveled by the driven element between halts=$X-Y$. The minimum distance traveled by the driving element between halts is $X-Y$. The maximum distance traveled by the driving element between halts is $X+Y$.

For reciprocating rotary or linear motion, the maximum movement of the driving element cannot exceed $X+Y$ or be less than $X-Y$ with the driven element moving a reciprocating distance exactly equal $X-Y$.

BRIEF DESCRIPTION OF THE DRAWINGS

FIG. 1 is a section taken on line 1—1 of FIG. 2 of a rotary drive.

FIG. 2 is a section taken on line 2—2 of FIG. 1.

FIG. 3 is a section taken on line 3—3 of FIG. 4. This view is similar to FIG. 1 after additional rotation of the driving element which has brought the slots in the driven element and fixed control element into alignment. Locking of the two elements has occurred.

FIG. 4 is a section taken on the line 4—4 of FIG. 3.

BRIEF DESCRIPTION OF THE PREFERRED EMBODIMENT

Figure 5:
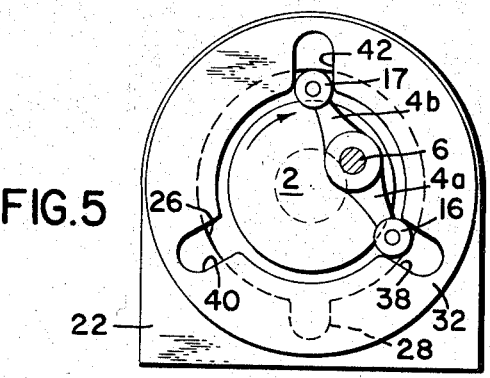
FIGS. 5 to 9 are small scale simplified sections similar to FIGS. 1 and 3 showing one complete revolution of the driving element and the related intermittent motion of the driven element.

In the following explanation of the drawing, there will be described two embodiments of the invention, one utilizing rotary motion and the other straight line motion.

The rotary motion construction is shown in FIGS. 1 to 9 and will be referred to first. In FIGS. 1, 2, 3 and 4 is shown a continuously rotating element 2 which for example may be a shaft. Mounted on the end of shaft 2 is means for mounting a driving arm 4. This arm is pivoted at its center, on a pivot 6, the ends of which are supported in bearing apertures 8 and 10 both of which are part of the shaft 2 end structure. Thus as shaft 2 rotates so does pivot 6 and driving arm 4. The aperture 10 is in the over hanging part 12 of a U-shaped extension 14 within which the arm 4 is rotatably located.

The arm 4 comprises two oppositely extending short arms 4a and 4b of equal length and 180° from each other. On the end of each arm 4a and 4b are first engaging parts 16 and 17 and second engaging parts 18 and 19. Parts 18 and 19 preferably are in the form of rollers mounted on axes 20 and 21 which extend from parts 16 and 17 parallel to pivot 6 and the axis of shaft 2. If desired, parts 16 and 17 may also be in the form of rollers.

A control element 22 (see FIGS. 1 and 3) having a circular interior aperture 24 is preferably mounted in fixed position to surround the end of shaft 2. Under some conditions to be referred to hereinafter, it may be desirable to mount control element 22 in a manner permitting it to be either fixed as shown in FIG. 1 or rotatable as shown in FIG. 3 under the control of any suitable mechanism. Such alternative rotatable mounting is suggested in FIG. 3 in which the periphery of element 22 is circular as indicated by the line 23, and element 22 is rotatably supported by bearings 25. Element 22 in the form shown in FIG. 3 may be rotated in increments or continuously at controlled speeds, for example, by a power driven gear 27. The circular interior aperture 24 has its axis coincident with the axis of shaft 2. The dimensions of the various parts are such that the rollers 18 and 19 engage certain portions of the interior circular wall 26 of aperture 24. Wall 26 will be referred to for the most part hereinafter as the control edge. The rollers 18 and 19 ride on this control edge as shaft 2 rotates. For convenience, the shaft 2 as viewed in FIGS. 1 and 3 will be assumed to rotate clockwise.

The body of control eilement 22 may have one or more slots extending outwardly from edge 26. The number and spacing of the slots controls the extent of movement of the driven element. For illustrative purposes, a single slot construction is shown at 28 in FIGS. 1 and 3 and its dimensions are such as to permit entrance therein of rollers 18 and 19 under conditions to be explained later.

A second shaft 30 coaxial with shaft 2 has means associated therewith that acting in cooperation with the control element makes it possible for shaft 30 to be intermittently driven by the continuously rotating shaft 2. Shaft 30 and its associated parts will be referred to as the driven element.

Thus far, we have the driving element in shaft 2 with the driving arms 4a and 4b, the control element 22 with control edge 26 and the driven element 30.

A ring 32 is mounted in fixed and coaxial relation with shaft 30 in any convenient manner. Herein it is shown as affixed in any convenient manner to a short cylindrical flange 34 of a disc 36 which is mounted on the end of shaft 30. Ring 32 has a plurality of radial slots 38, 40 and 42 each of which preferably is of substantially the same dimensions as slot 28 in control element 22 but deeper to the extent that the interior radius of ring 32 and the entrances to slots 38, 40 and 42 is less than the radius of control element edge 26.

As the mechanism is viewed in FIGS. 1 and 2, the parts 16 and 17 on the ends of arms 4a and 4b are located within the entrances to slots 38 and 42 in ring 32 and the rollers 18 and 19 are in rolling engagement with edge 26. Thus as shaft 2 rotates clockwise, part 16, restrained from moving further into slot 38 because of engagement of roller 18 with edge 26, exerts a rotating force on ring 32. This force is the tangential component of the compressive force in arm 4a. The radial component is absorbed in the pressure of roller 18 against edge 26.

If it is assumed that the tangential component is sufficient to overcome the load on shaft 30, then ring 32 and shaft 30 will rotate at the same rate as shaft 2. This rotation continues until slot 38 in rotating element 32 comes into alignment with the stationary slot 28 in control element 22. This situation is illustrated in FIGS. 3 and 4. As the overlapping of the slots passes the halfway point, roller 18, leaving its engagement with edge 26 and acting under the radial component, begins its outward radial movement into slot 28. Part 16 is still exerting a tangential force against the wall of slot 38 even as it is moving outwardly further into slot 38 as permitted by the movement of roller 18 into slot 28 as the slots approach alignment.

As soon as the slots reach complete alignment, the ring 32 and control element 22 are locked against relative rotation by the locating of parts 16 and 18 in slots 38 and 28, respectively. Parts 16 and 18 are then compelled by continued rotation of pivot 6 to move to the full depth of the slots. This condition is shown in FIGS. 3 and 4. Rotation of ring 32 cannot be resumed until roller 18 has been withdrawn from slot 28.

Referring back to the four o'clock position of pivot 6 which prevailed as the parts 16 and 18 commenced their movement into slots 38 and 28, the arms 4a and 4b began counterclockwise rotation on moving pivot 6. This caused withdrawal of part 17 from ring slot 42. The intermediate position of part 17 enroute from slot 42 to slot 40 is shown in FIGS. 3 and 4.

As pivot 6 moves from 6 to 8 o'clock position, as viewed in FIG. 3, part 18 will be fully withdrawn from slot 28 and clear of edge 26 and part 16 will be withdrawn to its previous position within the walls near the entrance end of slot 38. At the same time, part 17 will advance toward and finally enter slot 40 which during this period is stationary. The entry of part 17 into slot 40 is limited by engagement of roller 19 with control edge 26. The new positions of parts 16, 17, and 18, 19 and pivot 6 are shown in dotted lines in FIG. 3.

In this new position, a compressive force will develop in driving arm 4b and a tangential force will be applied to the leading wall of slot 40. Since roller 18 is now clear of slot 28, rotation of the driven element (ring 32 and shaft 30) is resumed.

Shaft 30 has been stationary during rotation of shaft 2 from 4 o'clock to 8 o'clock position, that is, while shaft 2 rotated through 120°, shaft 30 did not move. Now, with resumption of movement of shaft 30 under the force of part 17 against the wall of slot 40, rotation will continue until slot 40 comes into alignment with the fixed slot 28 in the control element.

Figure 6:
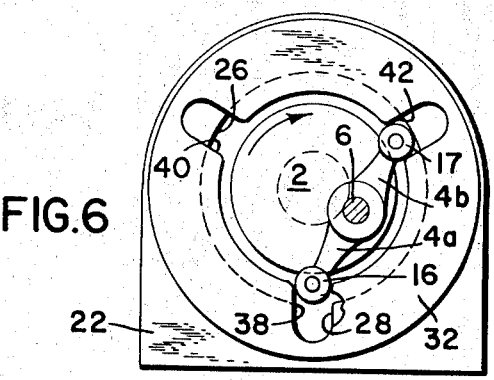
Figure 9:
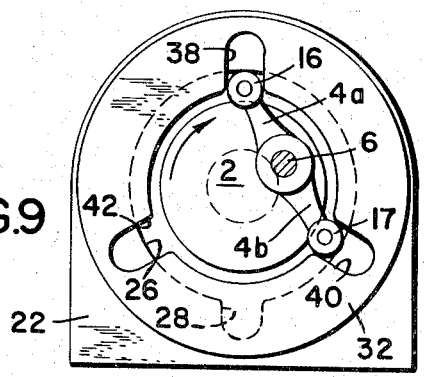

A summary of the foregoing operations for 360° rotation is illustrated in FIGS. 5 to 9. FIG. 5 corresponds to FIG. 1. In FIG. 6, slot 38 of ring 32 has become aligned with fixed slot 28 and parts 16 and 18 are about to enter the aligned slots to stop rotation of ring 32.

Figure 8:
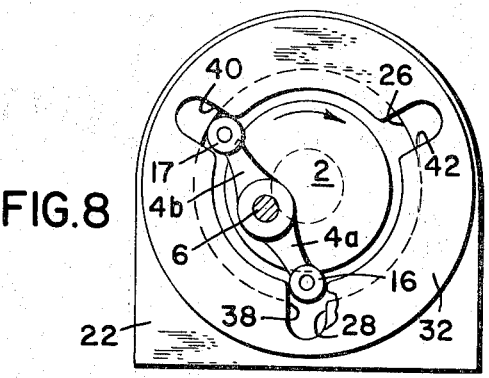
Figure 7:
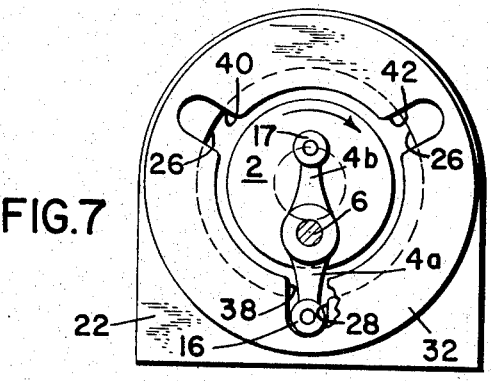

Rotation of shaft 2 continues for 120° from the position of FIG. 6 through the locked position of FIG. 7 to that of FIG. 8 before rotation of ring 32 is resumed. Rotation of the driven element (ring 32) then resumes and continues for 240° until slot 40 is aligned with slot 28 when parts 17 and 19 enter the aligned slots to again stop rotation. Alignment of slots 40 and 28 occurs 60° beyond the position of pivot 6 in FIG. 9.

The continued movement of pivot 6 after alignment of slots 40 and 28 causes arm 4a to swing out of slot 38 and enter slot 42 which is then at 10 o'clock position. Simultaneously withdrawal of parts 17 and 19 from aligned slots 40 and 28 occurs and rotation of ring 32 for another 240° takes place.

This series of movements repeats continuously. Driven element 30 rotates for 240° with and at the same speed as driving element 2. Element 30 then stops while element 2 continues rotation for 120°. Rotation of element 30 then resumes for another 240° and so on.

It should be apparent that the extent of the intermittent angular rotation of driven element 30 can be controlled (1) by the number of slots in ring 32 and (2) by the number and spacing of fixed slots in control element 22.

Some of the arrangements are set forth in the following tables:

| Number of fixed slots in the control element equally spaced | Number of slots in ring 32, all equally spaced thereabout | Angular rotation of driven element during one revolution of driving element |
|---|---|---|
| 1 | 3 | 240°. |
|   | 4 | 270°. |
|   | 5 | 288° or 216°. |
|   | 6 | 300° or 240°. |
|   | 8 | 315°, 270° or 225°. |
|   | 9 | 320°, 280°, 240°, or 200°. |
| 2 | 3 | 2 of 60° each. |
|   | 4 | 2 of 90° each. |
|   | 5 | 2 of 108° each. |
|   | 6 | 2 of 120° each. |
| 3 | 4 | 3 of 30° each. |
|   | 5 | 3 of 48° each. |
|   | 6 | 3 of 60° each. |
| 4 | 5 | 4 of 18° each. |
|   | 6 | 4 of 30° each. |

Of course, the length of arms 4a and 4b and the radial position of pivot 6 will have to be adjusted to fit the changed slot spacing in the ring 32. It should also be noted that the number of fixed operative slots in the control element must always be less than the number of slots in the ring 32.

It will also be appreciated that the slots (when more than one) in the control element need not be equally spaced but in such case the extent of the intermittent rotation of the driven element will not be of equal angularity.

For example, suppose there were two slots in the fixed control element 22 spaced 120° and 240° apart and in ring 32 there were four slots spaced 90° apart, then the motion of the driven element 30 during one revolution of the driving element would consist of two angular movements of 30° and 150°. The totals of the intermittent motions of the driven element 30 for one revolution of the driving element 2, however divided, are the same as in the tables above.

Figure 18:
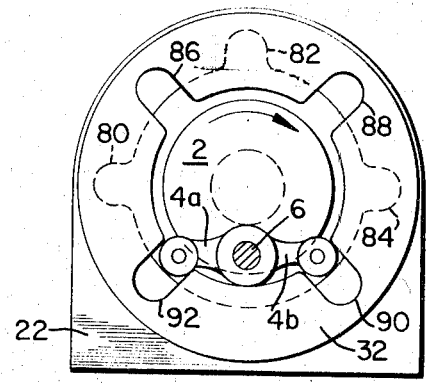
FIG. 18 illustrates another species of the invention.

As another example (see FIG. 18), consider the control element 22 as having three slots 80, 82 and 84 spaced 90°, 90° and 180° apart and the driven element having four slots 86, 88, 90 and 92, each equally spaced 90° from the others. This would result in a single 90° movement of the driven element. Upon alignment of the operative ring slot 92 with the first control element slot 80, the driving arms 4a and 4b would successively enter three pairs of aligned slots 80, 92; 82, 86; and 84, 88 spaced at 90° with no movement of the driven element 32 while the driving element 2 moved forward 270°.

This analysis again confirms the statement above that regardless of the slot spacing in the control element, the total rotation of the driven element during a 360° rotation of the driving element will always equal the total achieved under equal slot spacing in the control element as indicated in the table above giving the numbers of slots in the control element and the driven element. Thus, for example, where there are three slots equally spaced in the control element and four slots equally spaced in the driven element, the movement of the driven element during one rotation of the driving element is three equally spaced movements of 30°; that is, a total rotative movement of 90°. This total movement is the same as the single 90° movement under the unequal slot spacing in the control element set forth in the preceding paragraph.

Thus it can be seen that the user can provide sets of slotted control elements and slotted rings 32 to give intermittent rotation of the driven element in as many angular arrangements as may be needed.

An additional refinement of the control of the intermittent angular rotation of driven element 30 may be achieved in this manner. Fixed control element 22 as viewed in FIGS. 1 and 3, for example, may be mounted as shown in FIG. 3 for rotation on bearings 25 and have a gear 27 for shifting its angular position either continuously or intermittently and at changing speeds as may be desired. For example, while slot 38 is moving from the position of FIG. 1 toward slot 28, control element 22 might be rotated clockwise 10° by the gear 27 in FIG. 3. Element 22 would then be stopped in this advanced position before slots 38 and 28 become aligned. When alignment occurred, it is apparent that ring 32 would have rotated an extra 10° or 280° instead of the normal 270°. Thus by advancing or retracting the position of slot 28 during the rotation of ring 32 and prior to the alignment of the fixed and moving slots, the extent of rotation can be varied or controlled without changing ring 32 or control element 22. Fine angular adjustment is thus made possible.

Under some conditions of rotary operation, it might be desirable to modify or eliminate temporarily or cyclically the normally repetitive intermittent movement of the driven element by imparting rotation to the control element. The said rotation of the control element may be continuous, variable, or intermittent in either direction relative to that of the driving element, or the control element may be reciprocated at any desired speed and amplitude. When under aligned slot conditions a roller 19 or 18 enters a slot 28 in control element 22, the driven element is locked rotationally to the control element and the driven element must then rotate at the same speed and in the same direction as the then moving control element until rotation of the driving element relative to the rotation of the control element causes rollers 18 or 19 to withdraw from slot 28 releasing the locked condition.

Coming now to FIGS. 10 to 16 the use of the invention to convert continuous or reciprocating linear motion into intermittent linear motion will now be explained.

In the plan views of FIGS. 10 to 13, the fixed control element is numbered 50, the continuously moving driving element 52 and the intermittently moving driven element 54.

The control element 50 has a control edge 56 and one or more fixed slots S1, S2, S3, etc. Driven element 54 which overlaps element 50 has a series of slots designated A, B, C, D, E, etc. Its rear edge slides against the low vertical wall 55 of element 50.

If the intermittent movement of driven element 54 is to be of equal linear distance, the slots in the control element 50 must be equally spaced. The slots in driven element 54 must be equally spaced to receive the rotating driving arms. The spacing of slots S1, S2, etc., must be greater than the spacing of slots A, B, C, etc. If, as shown in FIG. 10, the distance between slots S1, S2, S3, etc. is X and the distance between slots A, B, C, etc. is Y, then the distance driven element 54 travels on each intermittent movement will be $X-Y$.

The continuously moving driving element 52 is guided in any convenient manner as by control edge 56 and the low opposite wall 57. See FIGS. 14, 15 and 16. The moving force for element 52 may, for example, be a piston rod 58.

The moving element 52 has pivotally mounted thereon at least two and preferably three integrally connected arms 60 and individually indicated at 60a, 60b and 60c. On the ends of arms 60a, 60b and 60c are, respectively, first parts 62a, 62b and 62c which in turn apply a driving force to the driven element 54 and and second parts 64a, 64b and 64c (see FIGS. 14, 15 and 16) which in turn run along control edge 56 during movement of driven element 54. The second part and the first part enter the aligned slots in control element 50 and driven element 54 to lock the latter temporarily against linear movement. The pivot 66 and which arms 60 are mounted permits free rotation thereof while maintaining the first and second parts 62 and 64 at a constant level. The spacing between parts 62a and 62b and 62c is equal to Y, the distance between the center lines of slots A, B, C, etc., and the angular spacing of arms 60a, 60b and 60c is 120°.

Figure 10:
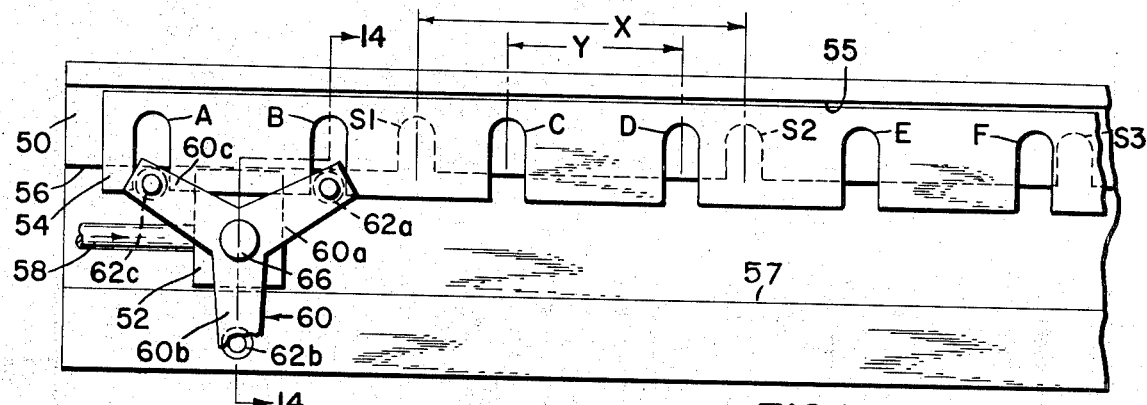
FIGS. 10 to 13 show the relative movements of the driving and driven elements in a linear device.

Starting with FIG. 10 with element 52 moving to the right, the force applying part 62a is pressed against the right side of slot B by arm 60a. Part 62a enters slot B only to the extent permitted by the engagement of part 64a with control edge 56.

The compressive force in arm 60a is resolved into a first force acting through part 62a parallel to edge 56 which causes element 54 to move with respect to control element 50 and into a second force acting through part 64a normal to edge 56.

Figure 11:
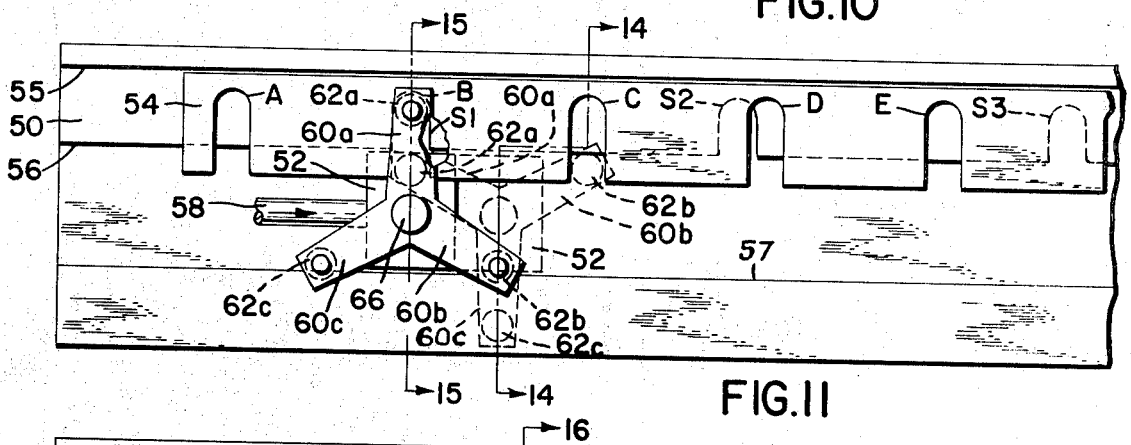

When driven element 54 reaches the position of FIG. 11, slots B and S1 will be aligned and parts 62a and 64a automatically enter the slots, locking element 54 to element 50. As this occurs, arm 60c swings part 62c out of slot A. Continued movement of element 52 causes automatic rotaton of arms 60. When the dotted line position of element 52 is reached as shown in FIG. 11, part 62a will have withdrawn to the outer part of slot B and part 64a will have withdrawn fully from slot S1. Part 62b on arm 60b will be in the outer entrance to slot C and part 64b will rest against edge 56. Element 54 then resumes its forward motion propelled by the arm 60b.

Figure 12:
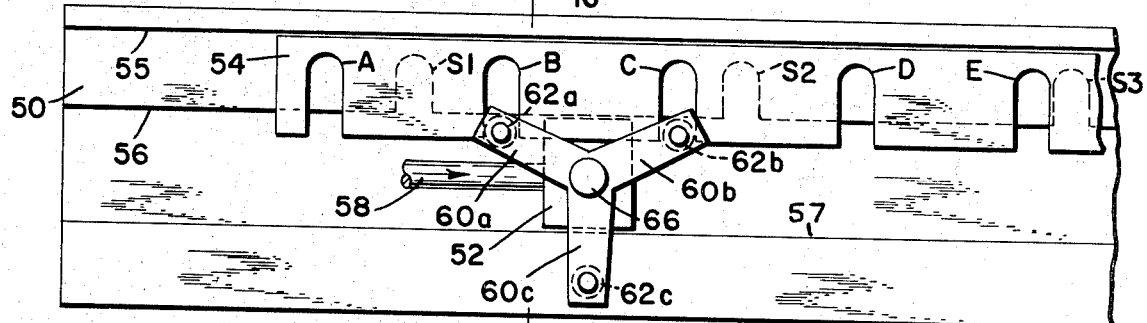
Figure 13:
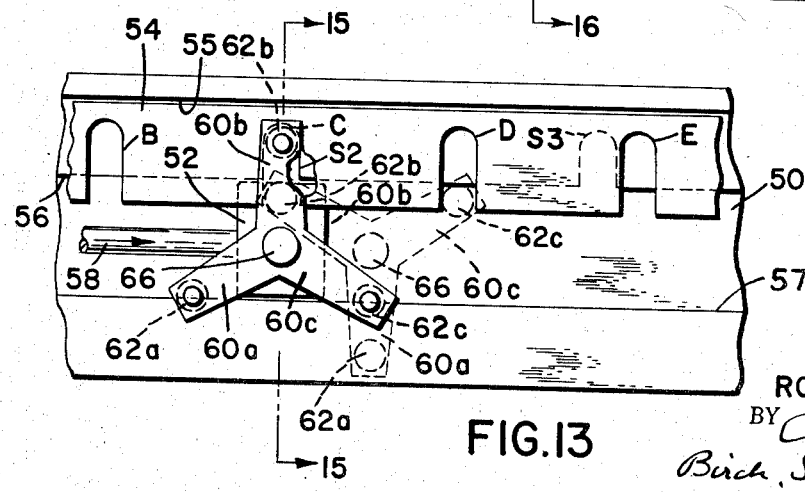
Figure 14:
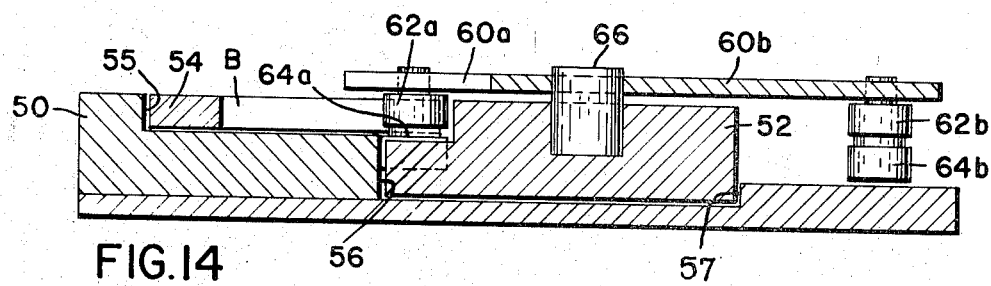
FIG. 14 is a section on line 14—14 of FIGS. 10 or 11 with different driving arms in driving position and the driven element enroute to the next locking position.
Figure 15:
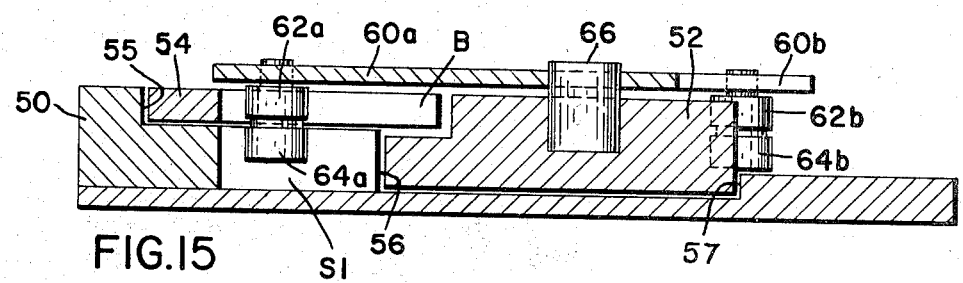
FIG. 15 is a section on line 15—15 of FIGS. 11 or 13 with different driving arms in locking position.
Figure 16:
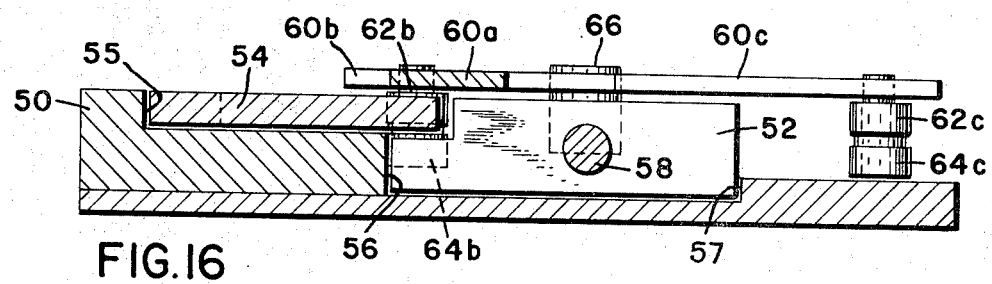
FIG. 16 is a section on line 16—16 of FIG. 12 showing the driven element enroute to the next locking position.
Figure 17:
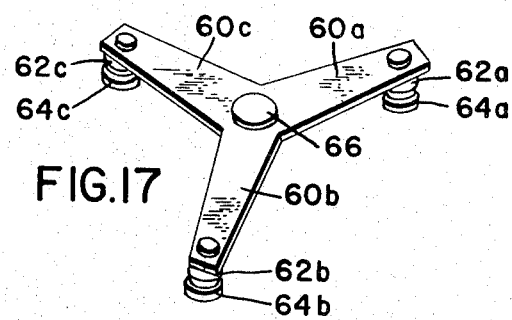
FIG. 17 is a perspective view of the arms and engaging parts shown in FIGS. 10 to 16.

The advance from FIG. 11 is shown in FIGS. 12 and 16. Slot B has moved away from slot S1 and slot C is approaching slot S2. When slot C comes into alignment with slot S2, element 54 will have moved a distance $X-Y$ from its locked position shown in FIG. 11. Continued advance of driving element 52 automatically moves parts 62b and 64b on arm 60b into the aligned slots C and S2, holding element 54 locked to element 50. The locking is effective through the entire period of entrance and withdrawal of parts 62b and 64b.

Further advance of driving element 52 withdraws parts 62b and 64b from slots C and S2 and places part 62c on arm 60c in the outer part of slot D with part 64c against edge 56. Forward movement of driven element 54 then resumes and will continue until slot D reaches slot S3.

The foregoing intermittent movements of driven element 54 are repeated over the length of control element 50. When the movement to the right ends, piston rod 58 may be moved to the left causing the same intermittent motion of element 54 in the opposite direction.

The extent of each movement of element 54 is determined by the difference between the distances X and Y (see FIG. 10). The time that element 54 is stationary may be increased or decreased by changing the distance Y and the length of arms 60 while maintaining the differential of $X-Y$.

In some situations, it may be useful to reciprocate the driven element 54 back and forth over a single unit of distance. For example, element 54 might be moved to the right from the position in FIG. 11 in which slots B and S1 are aligned to the position in FIG. 13 in which slots C and S2 are aligned and then back to the left to the position in FIG. 11. This movement, a distance exactly equal to $X-Y$, can be accomplished by reciprocating movement of driving element 52 over a distance equal to or more than the distance $X-Y$. That is to say, there may be overtravel in the driving element without affecting the exact travel desired in the driven element. The extent of the overtravel of element 52 in each direction may be as much as the distance Y, and a maximum travel of the driving element of $X+Y$.

Another alternative construction based on the foregoing principles contemplates that the control edge 56, instead of being straight, might be irregular. Driven element 54 and driving element 52 both controlled in their movement by engagement with 56 would follow similar parallel paths without affecting the extent of the longitudinal intermittent movement of element 54.

It is intended to cover all changes and modifications of the examples of the invention herein chosen for purposes of the disclosure which do not constitute departures from the spirit and scope of the invention.

I claim:

1. Means for producing intermittent motion in a driven element, said means comprising a continuously moving driving element, a normally stationary control element adjacent and partially overlapping said driven, slots in said control and driven elements which repeatedly come into alignment as said driven element is moved with respect to said control element, a control edge between said control element slots, pivoted means associated with said driving element for engaging partially within a non-aligned slot of said driven element to the extent permitted by said control edge and moving the driven element until said engaged slot becomes aligned with a control element slot, at which position said pivoted means then enters said aligned slots to a greater depth to lock said driven and control elements temporarily against relative movement, and other pivoted means associated with said driving element to engage partially within a second non-aligned slot of said driven element to the extent permitted by said control edge to cause resumption of movement of said driven element as said first pivoted means is withdrawn from said aligned slots.

2. Means for producing intermittent motion comprising a continuously moving driving element, a normally stationary control element having at least one slot therein and control edges extending from said slot, a driven element adjacent and overlapping said control element and having more slots therein than said control element, first pivoted means on said driving element for engaging simultaneously a slot of said driven element and one of said control edges and moving the driven element until said engaged slot comes into alignment with a slot in said control element at which position said first pivoted means will enter said aligned slots to a greater depth temporarily locking said driven and control elements together, second pivoted means fixed to said first pivoted means for simultaneously engaging another slot of said driven element and one of said control edges as said first pivoted means is withdrawn from said aligned slots and moving the driven element to a second position at which said another slot comes into alignment with the next control element slot and said second pivoted means will enter said aligned slots to a greater depth temporarily locking said driven and control elements together, said intermittent motion of said driven element being continued by the repeated alternate aforesaid action of said first and second pivoted means.

3. A driving element and a relatively fixed control element having an edge which parallels the line of travel of said driving element, a third movable driven element overlapping said fixed element edge, means for guiding the movement of said third element along a path parallel to said edge, an arm pivoted on said driving element, said arm having first and second parts on its free end, means on said third element in advance of the direction of travel of said pivot for simultaneously engaging said first part of the said arm end and forcing said second part of said arm end against said fixed control element edge in movable relation thereto, whereby the compressive force applied by said driving element to said arm is resolved into a force against said third element parallel to said edge and a force against said edge normal thereto to cause said third element to move with said driving element and past said fixed control element in a direction parallel to said edge, means for stopping the movement of said third element without stopping said driving element, said stopping means comprising at least a first slot in said third element extending from said arm engaging means and overlapping said fixed control element and a second slot in said fixed control element extending from said edge, said first and second parts on said arm end being less than the width of said respective slots and adapted, when said slots come into alignment with each other, to enter said aligned slots, and then to withdraw from said slots as said pivot moves away therefrom, said parts while within both slots acting to anchor said third element to said fixed control element.

4. The construction as set forth in claim 3 in which said pivot rotates about an axis and said edge of said fixed control element that is engaged by said second part is circular and said slots are radial with respect to said axis.

5. The construction as set forth in claim 4, there being a plurality of slots in said third driven element equally spaced thereabout, and a second arm with first and second parts on its free end fixed to said first arm and extending from said pivot at 180° from said first arm, said first and second arms having a combined effective length equal to the chord subtending the arc between two slots in said third element.

6. The construction as set forth in claim 3, means for causing resumption of movement of said third element, said means comprising a second arm with first and second parts on its free end rigidly affixed to said pivoted arm and extending at not less than 90° therefrom, a second arm engaging means on said third element in advance of said first arm engaging means and so spaced therefrom as to be engaged by the first part of said second arm when said first and second parts on said first arm have been withdrawn from said aligned slots under the continued advance of said pivot and the second part of said second arm will engage said control element edge.

7. The construction as set forth in claim 6 in which said pivot moves in a straight line and said control element edge is straight.

8. The construction as set forth in claim 3, said first and second parts at the end of said arm disposed with respect to each other along a line parallel to the axis of said pivot.

9. The construction as set forth in claim 3, both said slots being at right angles to said control element edge.

10. A driving element following a circular path about an axis and a relatively fixed control element having an inner control edge which parallels the line of travel of said driving element, a movable driven element overlapping said fixed control element edge, means for guiding said driven element for rotary movement about an axis aligned with the said axis of said driving element, an arm pivoted at its mid-point on said driving element at a radial distance from said axis, said arm having first and second parts on both its ends, means on said driven element in advance of the direction of travel of said pivot for simultaneously engaging said first part of one of said arm ends and forcing said second part of said one arm end against the said inner control edge of said fixed control element in movable relation thereto, whereby the compressive force applied by said driving element to said one arm is resolved into a tangential force against said driven element and a force against said control element edge radial thereto to cause said driven element to move in a circular path parallel to said driving element, means for stopping the movement of said driven element without stopping said driving element, said stopping means comprising a first radial slot in said driven element extending outwardly from said arm engaging means and overlapping said fixed control element and a second radial slot in said fixed control element extending outwardly from said inner control edge, said first and second parts on said arm ends being less than the width of said respective slots and adapted, when said slots come into alignment with each other, to enter said slots simultaneously and then to withdraw from said slots as said pivot moves away therefrom, said parts while within both slots acting to anchor said fixed control element and said driven element against relative rotary movement.

11. A driving element following a straight line path and a relatively fixed control element having a straight control edge which parallels the line of travel of said driving element, a movable driven element overlapping said fixed control element edge, means for guiding the movement of said driven element along a straight line path parallel to said control element edge, at least three equally spaced arms mounted as a unit on a pivot on said driving element, said arms having first and second parts on their free ends, means on said driven element in advance of the direction of travel of said pivot for simultaneously engaging said first part of one of the said arms and forcing said second part of said arm against said fixed control element edge in movable relation thereto, whereby the compressive force applied by said driving element to said arm is resolved into a force against said driven element parallel to said control element edge and a force against said control element edge normal thereto to cause said driven element to move with said driving element in a direction parallel to said edge, means for stopping the movement of said driven element without stopping said driving element, said stopping means comprising a first slot in said driven element extending from said arm engaging means and overlapping said fixed control element and a second slot in said fixed control element extending from said control element edge, both said slots being substantially at right angles to said control element edge, said first and second parts on said arms being less than the width of said respective slots and adapted, when said slots come into alignment with each other, to enter said slots simultaneously and then to withdraw from said slots as said pivot moves away therefrom, said parts while within both slots acting to anchor said fixed control element and said driven element against relative movement, and means for causing resumption of movement of said driven element comprising other means on said driven element in advance of said aligned slots for engaging the first part of another of said arms simultaneously with the withdrawal of the said first and second parts on said first arm from said aligned slots as said driving element continues its movement, and an extension of said control element edge being engaged by the second part of said another arm.

12. A reciprocating driving element, at least two arms angularly spaced at less than 180° and mounted at their mid-point on a pivot on said driving element, said arms having on their free ends first and second parts, a fixed control element with an edge parallel to the line of motion of said driving member and closer to said pivot than the length of each said arm, a movable driven element having portions closer to said pivot than said control element edge, means for guiding said driven element for movement parallel to said control element edge, at least two slots in the said closer portions of said driven element, said slots being at right angles to said control element edge, said driven element slots so spaced as to receive simultaneously said first parts of the free ends of said arms, while said second parts of said free ends may engage said control element edge, and at least one slot in said fixed control element at right angles to said control element edge, whereby when the said driven element is moved in one direction by the engagement of the leading arm of said driving element with a driven element slot into alignment with said fixed control element slot, said first and second parts of said leading arm will enter said aligned slots under the continuing advance of said driving element thereby to lock said fixed control element and said driven element against relative movement so long as said first and second parts remain in both said aligned slots, and whereby reversal of movement of said driving element will cause withdrawal of said first and second parts from said aligned slots and the first part of said other arm will reengage said driven element at the other slot therein to move said driven element in the opposite direction.

13. The construction as set forth in claim 12, said fixed control element having at least two effective operative slots therein, both at right angles to said control element edge and both spaced farther apart than any two adjacent slots in said driven element, whereby reciprocating movement of said driving element even though greater in extent than the distance between the said two slots in said fixed control element will result in reciprocating movement of said driven element equal to the distance between said two slots in said fixed control element less the distance between the two adjacent operative slots in said driven member.

14. A driving element rotatable about an axis and having two oppositely extending driving arms on a common pivot which is radially spaced from the said axis, each arm having first and second parts on the end thereof, a control element and a driven element, the said control element having a discontinuous interior control surface paralleling the path of said pivot, the driven element having a discontinuous interior surface surrounding the path of said pivot, said control element having three sectors with radially extending slots therebetween spaced 90°, 90° and 180° apart, said driven element having four sectors with radially extending slots therebetween spaced equally 90° apart, the radius of said control element surface over the said 180° sector being greater than the radius of the entrance of said driven element slots, whereby said first and second parts of said arms may successively enter three pairs of aligned slots as said driving element rotates without moving said driven member and whereby thereafter said first part of an arm will engage the fourth slot in said driven member and said second part of the same arm will engage said control element surface to advance said driven member until said fourth slot in said driven member comes into alignment with the slot in said control element at the end of said 180° sector after an advance of 90°, and whereby said driving element may then rotate 270° with said control element and driven element again locked together as said first and second parts on said arms successively enter three pairs of aligned slots in said control and driven elements.

References Cited

UNITED STATES PATENTS 3,408,877 11/1968 Olson _____ 74—84
3,421,380 1/1969 Mansour _____ 74—84

MILTON KAUFMAN, Primary Examiner

U.S. Cl. X.R.

74—88